(No Model.)
F. W. SNOW.
SWITCH STAND.
No. 372,716. Patented Nov. 8, 1887.
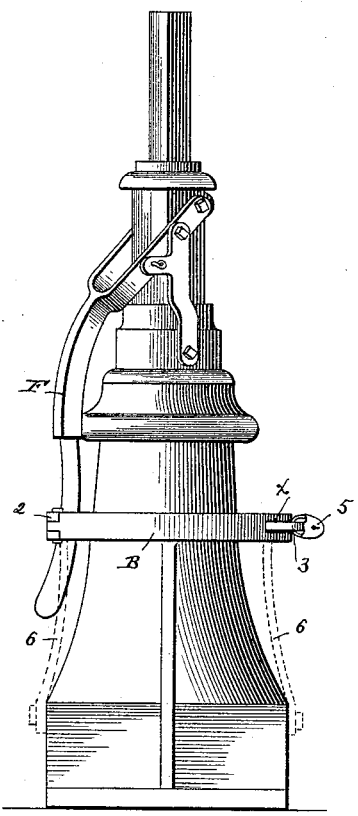
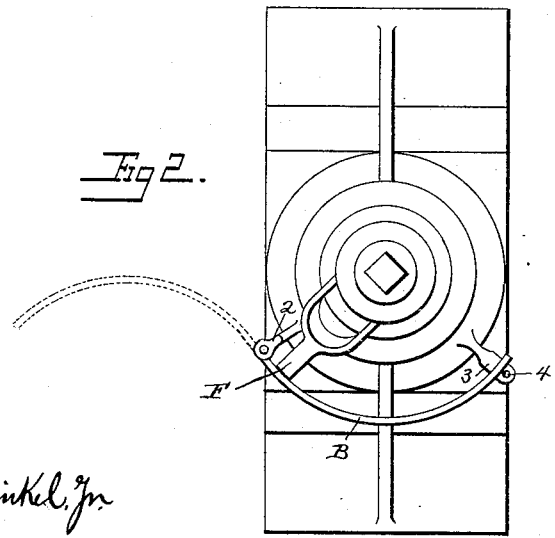

UNITED STATES PATENT OFFICE.

FRED. W. SNOW, OF RAMAPO, NEW YORK.

SWITCH-STAND.

SPECIFICATION forming part of Letters Patent No. 372,716, dated November 8, 1887.

Application filed April 27, 1887. Serial No. 236,340. (No model.)

*To all whom it may concern:*

Be it known that I, FRED. W. SNOW, a citizen of the United States, and a resident of Ramapo, Rockland county, New York, have invented certain new and useful Improvements in Switch-Stands, of which the following is a specification.

My invention relates to that class of railway-switch stands in which an operating-lever for moving and locking and unlocking the crank-shaft is used; and my invention consists in a means, fully set forth hereinafter, for securing the said lever in its locked position.

In the drawings, Figure 1 is an elevation of a railway-switch stand embodying my invention. Fig. 2 is a plan of Fig. 1.

In some switch stands it is common to use a lever which, when in a downward position, holds the parts in place, while permitting the partial revolution of the shaft, the lever moving with the shaft. One form of such stands is illustrated in Letters Patent granted to me June 23, 1885, No. 320,507, and also in the accompanying drawings, and need not be described in detail.

In said drawings, F is a lever, which, when raised to a horizontal position, serves to rotate the crank-shaft and to disconnect the clutch devices, so that the rotation of said shaft and setting of the switch can be effected without resistance; but when the lever is lowered, the clutch parts are engaged so that the shaft can only turn under the resistance of a spring. In order to permit this rotation and yet prevent the lever from being lifted, to turn the shaft, by unauthorized persons, I use a movable guard which extends around the stand to a partial extent, and which, when in place, prevents the lever from being lifted. Thus I pivot to the stand, or to a projection, 2, thereof, a guard, B, consisting of a curved bar having a slot, *x*, near the opposite end for the passage of a projection, 3, carried by the stand and having an opening, 4, through which to pass the bow of a padlock, 5, by which the guard may be locked in place and the lever protected against unauthorized manipulation. When it is necessary to adjust the switch, the padlock is removed and the guard swung out to the position shown in dotted lines, Fig. 2, when the lever can be raised, turned, and locked in a different position.

It will be evident that the guard may be hung adjustably in different ways to the stand. Thus it may have arms 6 6, dotted lines, Fig. 1, pivoted at the lower ends to the sides of the stand, so as to be turned downward away from the locking-projection 3 and again lifted to position and locked.

Without limiting myself to the precise construction and arrangement of parts shown, I claim—

1. The combination, with the stand, shaft, and operating-lever of a switch-stand, of a guard connected to the stand and adjustable to release the lever or to prevent the lifting of the same without interfering with the movement thereof with the shaft, substantially as described.

2. The combination of the shaft, stand, operating-lever pivoted to the shaft and guard pivoted to the stand to be locked in position outside of said lever to prevent the lifting thereof, substantially as described.

3. The combination of the stand, shaft, lever F, and guard B, pivoted at one end to the shaft to engage at the other end with a locking-projection on the shaft, substantially as described.

In testimony whereof I have signed my name to this specification in the presence of two subscribing witnesses.

FRED. W. SNOW.

Witnesses:
 A. W. WRIGHT,
 W. G. EASTON.